US011578184B2

(12) United States Patent
Tsunematsu et al.

(10) Patent No.: US 11,578,184 B2
(45) Date of Patent: Feb. 14, 2023

(54) ABSORBING FINE PARTICLE DISPERSION LIQUID AND ABSORBING FINE PARTICLES DISPERSION BODY HAVING EXCELLENT LONG-TERM STABILITY, AND METHOD FOR PRODUCING THEM

(71) Applicant: SUMITOMO METAL MINING CO., LTD., Tokyo (JP)

(72) Inventors: Hirofumi Tsunematsu, Isa (JP); Takeshi Chonan, Isa (JP); Takahisa Kawano, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 16/763,750

(22) PCT Filed: Nov. 13, 2018

(86) PCT No.: PCT/JP2018/042022
§ 371 (c)(1),
(2) Date: Sep. 10, 2020

(87) PCT Pub. No.: WO2019/093525
PCT Pub. Date: May 16, 2019

(65) Prior Publication Data
US 2020/0399438 A1 Dec. 24, 2020

(30) Foreign Application Priority Data
Nov. 13, 2017 (JP) .............................. JP2017-218521

(51) Int. Cl.
| | |
|---|---|
| *C08K 3/22* | (2006.01) |
| *C08J 5/18* | (2006.01) |
| *C08K 9/02* | (2006.01) |
| *C08K 9/04* | (2006.01) |
| *C09C 3/06* | (2006.01) |
| *C09C 3/08* | (2006.01) |
| *G02B 5/20* | (2006.01) |

(52) U.S. Cl.
CPC .................. *C08K 3/22* (2013.01); *C08J 5/18* (2013.01); *C08K 9/02* (2013.01); *C08K 9/04* (2013.01); *C09C 3/063* (2013.01); *C09C 3/08* (2013.01); *G02B 5/208* (2013.01); *C01P 2002/60* (2013.01); *C01P 2002/76* (2013.01); *C08J 2369/00* (2013.01); *C08K 2003/2258* (2013.01)

(58) Field of Classification Search
CPC ............ C08K 3/22; C08K 5/49; C08K 5/524; C08K 5/526; C08K 9/02; C08K 9/04; C08K 13/02; C08K 13/06; C08K 2003/2258; G02B 5/208; C01P 2002/60; C01P 2002/76; C08J 5/18; C08J 2369/00; C09C 3/063; C09C 3/06; C09C 3/08
See application file for complete search history.

(56) References Cited

U.S. PATENT DOCUMENTS

| | | | |
|---|---|---|---|
| 5,712,332 A | 1/1998 | Kaieda et al. | |
| 10,066,087 B2 * | 9/2018 | Kimura | ................. C09K 23/14 |
| 2006/0008640 A1 | 1/2006 | Chonan et al. | |
| 2006/0178254 A1 | 8/2006 | Takeda et al. | |
| 2008/0116426 A1 | 5/2008 | Adachi | |
| 2008/0308775 A1 | 12/2008 | Yabuki | |
| 2011/0144250 A1 | 6/2011 | Meyer et al. | |
| 2012/0157587 A1 * | 6/2012 | Meyer | .................. C08K 5/0041 |
| | | | 524/88 |
| 2012/0305863 A1 | 12/2012 | Togashi et al. | |
| 2015/0225545 A1 * | 8/2015 | Iwama | .............. B32B 17/10633 |
| | | | 428/432 |
| 2017/0232714 A1 | 8/2017 | Machida et al. | |
| 2017/0334735 A1 | 11/2017 | Machida et al. | |
| 2019/0040251 A1 | 2/2019 | Kobayashi et al. | |
| 2020/0002486 A1 | 1/2020 | Kadoya et al. | |

FOREIGN PATENT DOCUMENTS

| | | |
|---|---|---|
| CN | 106661293 A | 5/2017 |
| EP | 3214148 A1 | 9/2017 |
| JP | H03-35036 A | 2/1991 |
| JP | H06-256541 A | 9/1994 |
| JP | H06-264050 A | 9/1994 |
| JP | 2001-181495 A | 7/2001 |
| JP | 2008-127511 A | 6/2008 |
| JP | 2008-208274 A | 9/2008 |
| JP | 2011-1551 A | 1/2011 |
| JP | 2011-168636 A | 9/2011 |
| JP | 2013-64042 A | 4/2013 |
| JP | 2013-513708 A | 4/2013 |
| JP | 2017-145356 A | 8/2017 |
| WO | 2005/037932 A1 | 4/2005 |
| WO | 2005/087680 A1 | 9/2005 |

(Continued)

OTHER PUBLICATIONS

Feb. 5, 2019 International Search Report issued in International Patent Application No. PCT/JP2018/042022.
Aug. 23, 2021 Search Report issued in European Patent Application No. 18876814.7.

*Primary Examiner* — Jane L Stanley
(74) *Attorney, Agent, or Firm* — Oliff PLC

(57) ABSTRACT

A dispersion body having excellent heat ray shielding properties and long-term high temperature stability, and a dispersion liquid for producing the dispersion body, wherein the dispersion liquid contains liquid medium, absorbing fine particles dispersed in the medium, and a phosphite ester compound, the absorbing fine particles are one or more kinds of oxide fine particles selected from tungsten oxide fine particles represented by a general formula WyOz, and the phosphite ester compound is a phosphite ester compound represented by the following predetermined structural formula, and an addition amount of the phosphite ester compound is more than 500 parts by mass and 50000 parts by mass or less with respect to 100 parts by mass of the absorbing fine particles.

15 Claims, No Drawings

(56) References Cited

FOREIGN PATENT DOCUMENTS

| | | |
|---|---|---|
| WO | 2006/049025 A1 | 5/2006 |
| WO | 2010/143732 A1 | 12/2010 |
| WO | 2017/130492 A1 | 8/2017 |
| WO | 2018/155501 A1 | 8/2018 |

\* cited by examiner

ABSORBING FINE PARTICLE DISPERSION LIQUID AND ABSORBING FINE PARTICLES DISPERSION BODY HAVING EXCELLENT LONG-TERM STABILITY, AND METHOD FOR PRODUCING THEM

TECHNICAL FIELD

The present invention relates to an absorbing fine particle dispersion liquid in which absorbing fine particles are dispersed in a medium (may be referred to as "dispersion liquid" in the present invention), and an absorbing fine particles dispersion body (may be referred to as "dispersion body" in the present invention) having excellent long-term stability, and further relates to a dispersion liquid and a dispersion body containing functional fine particles that absorb electromagnetic waves typified by light and infrared rays (sometimes referred to as "absorbing fine particles" in the present invention), and a method for producing them.

DESCRIPTION OF RELATED ART

While curbing carbon dioxide emissions is required on a global scale to curb global warming, the number of skyscrapers and the number of automobiles used are increasing rapidly in emerging countries. As a result, there is a demand for effective use of solar radiation (referred to as "sunlight" in the present invention) and light control, weight reduction of moving objects such as automobiles. Further, to ensure the safety of a human body, there is a demand for measures against scattered and dropped objects that occur when window materials such as glass are damaged.

In the field of effective use of sunlight, attention has been focused on products using photoelectric conversion such as solar power generation and products using photothermal conversion such as solar water heaters.

In the field of light control, products such as curtains, blinds, smoke films, etc., which shield sunlight, including visible light, are attracting attention. Further, in recent years, a reflective glass or film that reflects most of the sunlight and transmits some, and an absorption glass or film in which functional particles that absorb light are dispersed, are attracting attention, and they are widely used as window materials for buildings such as houses and buildings and window materials for vehicles such as automobiles.

The sunlight includes ultraviolet rays and infrared rays in addition to visible light. Of the infrared rays contained in this sunlight, the near infrared rays with a wavelength of 800 to 2500 nm are called heat rays which enters an interior of a building or an interior of a vehicle through the above-described opening of the building or the vehicle and causes a temperature to rise. In order to suppress such a temperature rise, a reflective glass, a reflective film, an absorbing glass or an absorbing film is used for the opening.

In the field of weight reduction of moving bodies, it is required to obtain a combination of a transparent resin molding such as a polycarbonate resin and a heat ray shielding function. As a result, there is a rapid demand for a lightweight transparent resin molding having a heat ray shielding function that shields heat rays while sufficiently transmitting visible light and suppresses internal temperature rise while maintaining brightness.

Further, when windows of high-rise buildings and vehicles are damaged, scattered or fallen objects are generated, it can be said that there is a potential danger to a human body. Therefore, a heat ray shielding film has been attracting attention as a material capable of imparting a scattering prevention function to a window material.

Then, in response to the above-described demand, many proposals have been made regarding a molded body having a heat ray shielding function and a production method thereof.

In the production of reflective glass, first, a reflective layer is formed by depositing metal or metal oxide on a transparent resin film such as polyethylene terephthalate resin (PET). Then, the transparent resin film having the reflective layer formed thereon is laminated as an intermediate layer between two or more glass plates to produce a reflective glass.

However, there is also a method of forming the reflective layer directly on the glass plate by vapor deposition, etc., in addition to the method of adhering to the glass after forming the film with the reflective layer formed thereon.

Further, there is also a method of using a transparent resin molding such as an acrylic resin or a polycarbonate resin instead of glass.

However, in order to shield a large amount of heat rays and at the same time transmit a large amount of visible light, the reflective layer needs to be a multi-layered body of several tens of layers, which is expensive in itself. In addition, a complicated process such as adhesion for laminating may be required. As a result, in addition to further increasing a production cost, there is a defect that the reflective layer peels off from the glass due to aging.

On the other hand, the reflective film is obtained by depositing metal or metal oxide on a transparent resin film such as polyethylene terephthalate resin (PET) to form a reflective layer, and then processing it into a film, and is used by adhering to existing transparent glass. The reflective film is commercially available as a roll or a cut film.

Although the reflective film can be adhered to transparent glass etc., there are problems such as inclusion of air bubbles and occurrence of white clouding. Therefore, in order to obtain a desired performance, the work is often outsourced to a specialized contractor with appropriate technique. The cost required for the outsourcing, together with the cost of the reflective film, is an obstacle to a spread of the reflective film.

An organic near-infrared absorber represented by phthalocyanine compounds and anthraquinone compounds is frequently used for absorbing glass by coating on a glass surface or kneading into an intermediate layer. However, in order for the absorbing glass to absorb heat rays efficiently, large amounts of multiple organic near-infrared absorbers are required. As a result, sufficient transmission of visible light cannot be obtained in some cases. In addition, the organic near-infrared ray absorber is extremely inferior in long-term weather resistance, and when added in a large amount, deterioration such as color fading and deterioration occurs.

Here, Patent Documents 1 and 2 disclose, for example, a method of using inorganic particles having high weather resistance, such as mica coated with titanium oxide, instead of the organic near-infrared absorber described above. However, also in this method, in order to absorb a large amount of heat rays and shield a propagation of heat from outside, it is required to add a large amount of the inorganic particles. Accordingly, it is difficult to obtain sufficient visible light transmission like the organic near-infrared absorber. At the same time, an impact resistance, toughness, and ductility of the intermediate layer are deteriorated, which causes problems and limitations in strength and workability.

The absorbing film is a transparent resin film such as polyethylene terephthalate resin (PET) to which inorganic particles are applied, such as mica coated with the above-described organic near-infrared absorber or titanium oxide. A heat ray absorbing function can be imparted by a method such as coating on the film surface or kneading a filler into the film itself. The absorbing film is used by being adhered to existing transparent glass or the like, and is commercially available in a roll form or a cut film. In the same manner as the reflective film, self-adhesion of the absorbing film to the transparent glass etc., is possible, but there are problems such as inclusion of air bubbles and occurrence of white clouding. Therefore, in order to obtain a desired performance, the work is often outsourced to a specialized contractor with appropriate technique. The cost required for the outsourcing, together with the cost of the reflective film, is also an obstacle to a spread of the reflective film.

Further, it is also possible to use the above-described reflective glass/reflective film and absorbing glass/absorbing film in combination. However, as with any of the reflective and absorbing glass films described above, neither production cost nor construction costs can be avoided, which is an obstacle to the spread.

On the other hand, functional fine particles that absorb electromagnetic waves represented by light and infrared rays, include for example: tin-doped indium oxide (ITO), antimony-doped tin oxide (ATO), hexaboride, tungsten oxide, composite tungsten oxide, etc.

An applicant discloses in Patent Document 3 that among the above functional fine particles, the composite tungsten oxide has high transparency in a visible light region and has a large light absorption property in other wide wavelength regions, particularly in a near infrared region. The composite tungsten oxide was superior to the organic near-infrared absorber in long-term weather resistance. Further, an addition amount can be smaller than inorganic particles such as mica coated with titanium oxide, and a drop in impact strength, toughness, and ductility does not occur when used in the intermediate layer, which solves a problem and restriction in strength and workability.

Then, the applicant discloses in Patent Document 4 a structure of laminated glass in which an intermediate layer or film containing the fine particles is provided between at least two opposed transparent glass plate-like bodies. By using this structure for windows of various buildings and vehicles, brightness can be maintained while suppressing a temperature rise inside a building or inside a vehicle due to incident sunlight.

Further, the applicant discloses in Patent Document 5 the invention of a light absorbing resin composition for laser welding, utilizing the characteristic that functional fine particles such as composite tungsten oxide absorb light to generate heat, and provides a means for efficiently welding a plastic member.

Further, the applicant discloses in Patent Document 6 the invention of near-infrared absorbing fiber made into synthetic fiber by mixing with acrylic resin, polyester resin, etc, and a fiber product using the same, utilizing the characteristic that functional fine particles such as composite tungsten oxide absorb light to generate heat, and discloses an application method for heat generation and heat retention.

Further, the applicant discloses in Patent Document 7 a means for obtaining a heat ray-shielding transparent resin molded body with thermoplastic resin as a substrate, using a high heat-resistant dispersant having a high thermal decomposition temperature and the above tungsten oxide fine particles and/or composite tungsten fine particles.

Further, the applicant discloses in Patent Document 8 that when the above-described thermoplastic resin is a polyvinyl acetal (PVA) resin, addition of a prescribed color fading prevention agent is effective for obtaining high weather resistance, more specifically, in suppressing an increase in visible light transmittance of a heat ray shielding film in a holding environment in a high temperature atmosphere of 120° C.

Further, the applicant discloses in Patent Document 9 a phosphite ester compound.

PRIOR ART DOCUMENTS

Patent Documents

[Patent Document 1] Japanese Patent Laid-Open No. 1994-256541
[Patent Document 2] Japanese Patent Laid-Open No. 1994-264050
[Patent Document 3] International Publication No. 2005-037932
[Patent Document 4] International Publication No. 2005-087680
[Patent Document 5] Japanese Patent Laid-Open No. 2008-127511
[Patent Document 6] International Publication No. 2006-049025
[Patent Document 7] Japanese Patent Laid-Open No. 2011-001551
[Patent Document 8] Japanese Patent Laid-Open No. 2013-064042
[Patent Document 9] Japanese Patent Laid-Open No. 2001-181495

SUMMARY OF THE INVENTION

Problem to be Solved by the Invention

The above-described color fading prevention agent is effective as means for suppressing an increase in visible light transmittance of a substrate in a holding environment under the high temperature atmosphere of 120° C.

However, as a result of examination by the present inventors, it is found that as the use of the heat ray shielding film and the like expands, the heat ray shielding film and the like are required to have high temperature stability for a longer period of time.

The present invention has been made under the above circumstances, and a problem to be solved by the present invention is to provide a dispersion body having excellent heat ray shielding properties and long-term high temperature stability, and a dispersion liquid for producing the dispersion body, and a method for producing them.

Means for Solving the Problem

The present inventors have made earnest examination for the purpose of solving the above-described problems. As a result, it is found that a dispersion liquid added with phosphite ester compound having a predetermined structure, in an amount that would not be conceivable with a general resin molded body according to conventional technology, and a dispersion body produced using the dispersion liquid, have excellent heat ray shielding properties and is superior to that described in Patent Document 8 from a viewpoint of long-term high temperature stability. On the other hand, it is also found that reduction in stability under high temperature and high humidity does not occur, which was a concern with an addition of a large amount of the phosphite ester compound. Thus, the present invention is completed.

Namely, in order to solve the above-described problem, a first invention provides an absorbing fine particle dispersion liquid containing liquid medium, absorbing fine particles dispersed in the medium, and a phosphite ester compound, the absorbing fine particles being one or more kinds of oxide fine particles selected from tungsten oxide fine particles represented by a general formula WyOz (where W is tungsten, O is oxygen, 2.2≤z/y≤2.999), and composite tungsten oxide fine particles represented by a general formula MxWyOz (where, M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Sc, Br, Te, Ti, Nb, V, Mo, Ta, Re, Be, Hf, Os, Bi, I, and Yb, W is tungsten, O is oxygen, 0.001≤x/y≤1, 2.0≤z/y≤3), the phosphite ester compound being a phosphite ester compound represented by the following structural formula (1), and an addition amount of the phosphite ester compound being more than 500 parts by mass and 50000 parts by mass or less with respect to 100 parts by mass of the absorbing fine particles.

Structural formula (1)

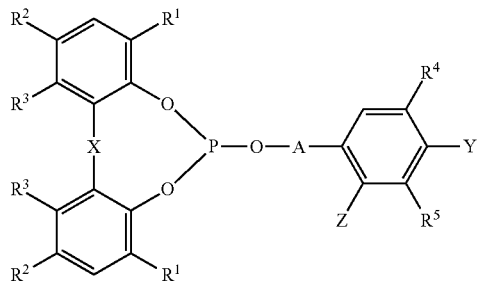

where, in the structural formula (1), R1, R2, R4 and R5 are each independently a hydrogen atom, an alkyl group having 1 to 8 carbon atoms, an alicyclic group having 5 to 12 carbon atoms, an aralkyl group having 7 to 12 carbon atoms or an aromatic group, R3 is either a hydrogen atom or an alkyl group having 1 to 8 carbon atoms, and X is any one of a single bond or a sulfur atom or a divalent residue represented by structural formula (1-1).

Structural formula (1-1)

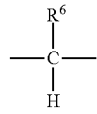

A is either an alkylene group having 2 to 8 carbon atoms or a divalent residue represented by structural formula (1-2), Structural formula (1-2)

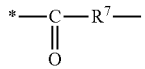

one of Y and Z is a hydroxyl group, an alkyl group having 1 to 8 carbon atoms, an alkoxyl group having 1 to 8 carbon atoms, or an aralkyloxy group having 7 to 12 carbon atoms, and the other one is either a hydrogen atom or an alkyl group having 1 to 8 carbon atoms, in the structural formula (1-1), R6 is a hydrogen atom or an alkyl group having 1 to 5 carbon atoms, and in the structural formula (1-2), R7 is either a single bond or an alkylene group having 1 to 8 carbon atoms, and * indicates that the residue is bonded to an oxygen atom side of the phosphite ester compound represented by the structural formula (1).

A second invention provides the absorbing fine particle dispersion liquid according to the first invention, further containing one or more kinds of stabilizers selected from a phosphoric acid-based stabilizer other than the phosphite ester compound, a hindered phenol-based stabilizer, a sulfide-based stabilizer, and a metal deactivator.

A third invention provides the absorbing fine particle dispersion liquid according to the first or second invention, wherein the absorbing fine particles are composite tungsten oxide fine particles represented by the general formula MxWyOz, and the M is one or more kinds selected from Cs, Rb, K, Tl, In, Ba, Li, Ca, Sr, Fe and Sn.

A fourth invention provides an absorbing fine particle dispersion liquid according to any one of the first to third inventions, wherein the absorbing fine particles are composite tungsten oxide fine particles having a hexagonal crystal structure.

A fifth invention provides the absorbing fine particle dispersion liquid according to any one of the first to fourth inventions, wherein a crystallite size of the absorbing fine particles is 1 nm or more and 200 nm or less.

A sixth invention provides the absorbing fine particle dispersion liquid according to any one of the first to fifth inventions, wherein surfaces of the absorbing fine particles are coated with a compound containing at least one element of Si, Ti, Zr, Al and Zn.

A seventh invention provides the absorbing fine particle dispersion liquid according to any one of the first to sixth inventions, wherein the medium for dispersing the absorbing fine particles are high molecular.

An eighth invention provides an absorbing fine particle dispersion body containing absorbing fine particles dispersed in a medium and a phosphite ester compound, the absorbing fine particles being one or more kinds of oxide fine particles selected from tungsten oxide fine particles represented by a general formula WyOz (where W is tungsten, O is oxygen, 2.2≤z/y≤2.999), and composite tungsten oxide fine particles represented by a general formula MxWyOz (where, M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I and Yb, W is tungsten, O is oxygen, 0.001≤x/y≤1, 2.0≤z/y≤3), the phosphite ester compound being a phosphite ester compound represented by the following structural formula (1), and an addition amount of the phosphite ester compound being more than 500 parts by mass and 50000 parts by mass or less with respect to 100 parts by mass of the absorbing fine particles, Structural formula (1)

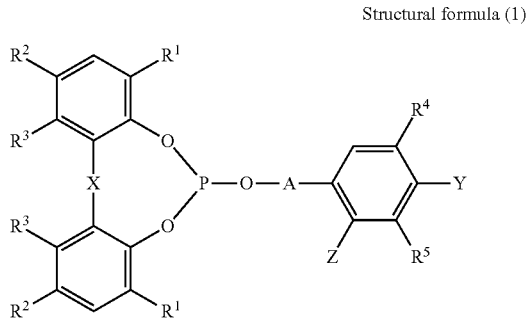

where in the structural formula (1), R1, R2, R4 and R5 are each independently a hydrogen atom, an alkyl group having 1 to 8 carbon atoms, an alicyclic group having 5 to 12 carbon atoms, an aralkyl group having 7 to 12 carbon atoms or an aromatic group, R3 is either a hydrogen atom or an alkyl group having 1 to 8 carbon atoms, and X is any one of a single bond or a sulfur atom or a divalent residue represented by structural formula (1-1).

Structural formula (1-1)

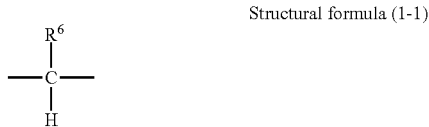

A is either an alkylene group having 2 to 8 carbon atoms or a divalent residue represented by structural formula (1-2), Structural formula (1-2)

one of Y and Z is a hydroxyl group, an alkyl group having 1 to 8 carbon atoms, an alkoxyl group having 1 to 8 carbon atoms, or an aralkyloxy group having 7 to 12 carbon atoms, and the other one is either a hydrogen atom or an alkyl group having 1 to 8 carbon atoms, in the structural formula (1-1), R6 is a hydrogen atom or an alkyl group having 1 to 5 carbon atoms, and in the structural formula (1-2), R7 is either a single bond or an alkylene group having 1 to 8 carbon atoms, and * indicates that the residue is bonded to an oxygen atom side of the phosphite ester compound represented by the structural formula (1).

A nineth invention provides the absorbing fine particle dispersion body according to the eighth invention, further containing one or more kinds of stabilizers selected from a phosphoric acid-based stabilizer other than the phosphite ester compound, a hindered phenol-based stabilizer, a sulfide-based stabilizer, and a metal deactivator.

A tenth invention provides the absorbing fine particle dispersion body according to the eighth or ninth invention, wherein the absorbing fine particles are composite tungsten oxide fine particles represented by the general formula MxWyOz, and the M is one or more kinds selected from Cs, Rb, K, Tl, In, Ba, Li, Ca, Sr, Fe and Sn.

An eleventh invention provides the absorbing fine particle dispersion body according to any one of the eighth to tenth inventions, wherein the absorbing fine particles are composite tungsten oxide fine particles having a hexagonal crystal structure.

A twelfth invention provides the absorbing fine particle dispersion body according to any one of the eighth to eleventh inventions, wherein a crystallite size of the absorbing fine particles is 1 nm or more and 200 nm or less.

A thirteenth invention provides the absorbing fine particle dispersion body according to any one of the eighth to twelfth inventions, wherein surfaces of the absorbing fine particles are coated with a compound containing at least one element of Si, Ti, Zr, Al and Zn.

A fourteenth invention provides the absorbing fine particle dispersion body according to any one of the eighth to thirteenth inventions, wherein a medium for dispersing the absorbing fine particles are high molecular.

A fifteenth invention provides the absorbing fine particle dispersion body according to any one of the eighth to fourteenth inventions, wherein the medium for dispersing the absorbing fine particles is polycarbonate resin, acrylic resin, olefin resin, polystyrene resin, polyamide resin, polyethylene terephthalate resin, fluorine resin, vinyl chloride resin, or epoxy resin.

A sixteenth invention provides a method for producing an absorbing fine particle dispersion liquid, including:

mixing absorbing fine particles which are one or more kinds of oxide fine particles selected from tungsten oxide fine particles represented by a general formula WyOz (where W is tungsten, O is oxygen, and 2.2≤z/y≤2.999), and composite tungsten oxide fine particles represented by a general formula MxWyOz (where M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, Yb, and W is tungsten, O is oxygen, 0.001≤x/y≤1, 2.0≤z/y≤3), and water, an organic solvent, a liquid resin, an oil and fat, a liquid plasticizer for the resin, a high molecular monomer, or a mixture of two or more selected from these groups, then, performing dispersion treatment, to obtain a dispersion liquid of absorbing fine particles;

adding more than 500 parts by mass and 50,000 parts by mass or less of phosphite ester with respect to 100 parts by mass of the absorbing fine particles while stirring the dispersion liquid; and continuing the stirring after the addition, to obtain a dispersion liquid of the absorbing fine particles whose surfaces are coated with the phosphite ester compound.

Advantage of the Invention

A dispersion body according to the present invention produced by using a dispersion liquid according to the present invention has excellent heat ray shielding properties and excellent long-term high-temperature stability, and the stability under high temperature and high humidity is also maintained.

DETAILED DESCRIPTION OF THE INVENTION

The dispersion liquid and the dispersion body having excellent long-term stability according to the present invention will be described hereafter in detail.

Main constituting features of the dispersion liquid and the dispersion body according to the present invention are: [a] absorbing fine particles. [b] medium in which the absorbing fine particles are dispersed (also referred to as "medium" hereafter). [c] additives such as UV absorbers, plasticizers, surfactants, antistatic agents, coupling agents, and phosphite ester compounds, and [d] dispersant for appropriately dispersing the absorbing fine particles in the medium.

Then, water, an organic solvent, a resin or the like which is liquid at room temperature is used as a medium of the dispersion liquid. On the other hand, an inorganic substance, an organic substance, a thermosetting resin, an ultraviolet curable resin or the like which is solid or gel at room temperature is used as a medium of the dispersion body. In some cases, it is possible to prepare the dispersion liquid or the dispersion body without using the [d] dispersant.

The dispersion liquid and the dispersion body according to the present invention, and respective constituent components constituting them, will be described hereafter, in an order of [a] absorbing fine particles. [b] medium, [c] additive, [d] dispersant, [e] dispersion liquid. [f] dispersion body, [g] conclusion.

[a] Absorbing Fine Particles

Absorbing fine particles according to the present invention are one or more oxide fine particles selected from tungsten oxide fine particles represented by a general formula WyOz (where W is tungsten, O is oxygen, $2.2 \leq z/y \leq 2.999$), and composite tungsten oxide fine particles represented by a general formula MxWyOz (where M is one or more elements selected from H, He, alkali metal, alkaline earth metal, rare earth element. Mg. Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, $0.001 \leq x/y \leq 1$, $2.0 \leq z/y \leq 3$).

The fine particles of the composite tungsten oxide represented by the general formula MxWyOz described above have excellent weather resistance when they have a hexagonal, tetragonal, or cubic crystal structure, and therefore it is preferable to contain one or more crystal structures selected from the hexagonal structure, the tetragonal structure, and the cubic structure.

Particularly, among the elements of M, fine particles of composite tungsten oxide are preferable containing one or more elements selected from the elements of Cs, Rb, K, Tl, In, Ba, Li, Ca, Sr, Fe and Sn, which constitute the hexagonal crystal structure, and further Cs having a high electromagnetic wave absorption and an excellent transmission in the visible light region of a wavelength of 400 nm to 780 nm, is preferable.

Addition amount x of the added M element is preferably 0.001 or more and 1 or less in terms of x/y, and further, the value of x/y theoretically calculated from the hexagonal crystal structure is preferably around 0.33. On the other hand, an abundance z of oxygen is preferably 2.0 or more and 3.0 or less in terms of z/y. Typical examples include $Cs_{0.33}WO_3$, $Rb_{0.33}WO_3$, $K_{0.33}WO_3$, $Ba_{0.33}WO_3$, $Cs_{0.03}Rb_{0.03}WO_3$ and the like. When x, y, and z are within the above range, useful electromagnetic wave absorption properties can be obtained.

Further, from a viewpoint of exhibiting excellent electromagnetic wave absorption properties, the crystallite size of the absorbing fine particles is preferably 1 nm or more and 200 nm or less, more preferably 1 nm or more and 100 nm or less, and further preferably 10 nm or more and 70 nm or less. To measure the crystallite size, measurement of an X-ray diffraction pattern by a powder X-ray diffraction method (θ-2θ method) and analysis by a Rietveld method are used. To measure the X-ray diffraction pattern, for example, a powder X-ray diffractometer "X'Pert-PRO/MPD" manufactured by Spectris PANalytical can be used.

Further, from a viewpoint of securing further weather resistance, it is also a preferable configuration that surfaces of the absorbing fine particles are coated with a compound containing at least one element of Si, Ti, Zr, Al and Zn.

[b] Medium

Liquid medium used for the dispersion liquid according to the present invention, solid or gel medium used for the dispersion body of the present invention, will be described in an order of 1. Liquid medium, 2. Solid or gel medium.

1. Liquid Medium

The medium of the dispersion liquid according to the present invention includes: for example, water, organic solvents such as toluene and hexane, liquid organic resins such as epoxy resin and acrylic resin, oils and fats, liquid plasticizers for medium resins, high molecular monomers, or mixtures thereof, which are liquid at room temperature. The liquid medium is variously selected according to the dispersion body produced using the dispersion liquid, and is not particularly limited.

Here, as the organic solvent used in the infrared absorbing fine particle dispersion liquid according to the present invention, various ones such as alcohol-based, ketone-based, hydrocarbon-based, glycol-based, water-based, and the like can be used. Specifically, alcoholic solvents such as methanol, ethanol, 1-propanol, isopropanol, butanol, pentanol, benzyl alcohol, diacetone alcohol;

ketone solvents such as acetone, methyl ethyl ketone, methyl propyl ketone, methyl isobutyl ketone, cyclohexanone, isophorone;

ester solvents such as 3-methyl-methoxy-propionate;

glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate; amides such as formamide, N-methylformamide, dimethylformamide, dimethylacetamide, N-methyl-2-pyrrolidone;

aromatic hydrocarbons such as toluene and xylene;

ethylene chloride, chlorobenzene, etc., can be used.

Then, among these organic solvents, particularly, dimethyl ketone, methyl ethyl ketone, methyl isobutyl ketone, toluene, propylene glycol monomethyl ether acetate, n-butyl acetate, etc., can be preferably used.

As the fats and oils, vegetable fats and oils or vegetable-derived fats and oils are preferable. As the vegetable oil, dry oils such as linseed oil, sunflower oil, tung oil, eno oil, semi-dry oils such as sesame oil, cottonseed oil, rapeseed oil, soybean oil, rice bran oil, poppy oil, non-dry oils such as olive oil, coconut oil, palm oil, dehydrated castor oil, and the like can be used. As the compounds derived from the vegetable oils, fatty acid monoesters, ethers, etc. obtained by directly esterifying fatty acids of the vegetable oils with monoalcohols, can be used.

Further, commercially available petroleum solvents can also be used as the fats and oils. As a commercially available petroleum solvent, Isopar (registered trademark) E, Exol (registered trademark) Hexane, Heptane, E, D30, D40, D60, D80, D95, D110, D130 (all manufactured by ExxonMobil), etc., can be used.

As the liquid plasticizer for medium resin, known liquid plasticizers represented by organic acid ester-based compounds and phosphoric acid ester-based compounds can be used. By using the liquid plasticizer as a liquid medium in a stage of a dispersion liquid, plasticity of a dispersion body obtained later can be improved. Then, the obtained dispersion body having plasticity can be sandwiched between, for example, at least two or more transparent substrates to form a composite structure.

Here, as a more specific liquid plasticizer, for example, a plasticizer that is a compound of a monohydric alcohol and an organic acid ester, an ester-based plasticizer such as a polyhydric alcohol organic acid ester compound, a phosphoric acid plasticizer such as an organic phosphoric acid plasticizer, etc., can be used, and all of them are preferably liquid at room temperature. Among them, a plasticizer which is an ester compound synthesized from a polyhydric alcohol and a fatty acid is preferable.

The ester compound synthesized from polyhydric alcohol and fatty acid is not particularly limited, and includes for example, glycols such as triethylene glycol, tetraethylene glycol, and tripropylene glycol, a glycol ester compound obtained by a reaction between glycols such as triethylene glycol, tetraethylene glycol, tripropylene glycol, and monobasic organic acids such as butyric acid, isobutyric acid, caproic acid, 2-ethylbutyric acid, heptylic acid, n-octylic acid, 2-ethylhexylic acid, pelargonic acid (n-nonylic acid), and decylic acid, and also includes ester compounds of tetraethylene glycol and tripropylene glycol with the above-described monobasic organic compounds.

Among them, fatty acid esters of triethylene glycol such as triethylene glycol dihexanate, triethylene glycol di-2-ethyl butyrate, and triethylene glycol di-octanoate, triethylene glycol di-2-ethyl hexanonate, can be used. Further, fatty acid esters of triethylene glycol can also be preferably used.

Further, a high molecular monomer is a monomer that forms a high molecule by polymerization, etc. Examples of preferable high molecular monomers used in the present invention include methyl methacrylate monomer, acrylate monomer, and styrene resin monomer.

The liquid mediums described above may be used alone or in combination of two or more. Further. pH may be adjusted by adding an acid or an alkali to these liquid media as needed.

2. Solid or Gel Medium

The medium used in the dispersion body according to the present invention is solid or gel at room temperature, and inorganic compounds such as glass and organic compounds such as polycarbonate resin and PET resin can be variously selected.

When the phosphite ester compound represented by the structural formula (1) is used, as a medium of the dispersion body, polycarbonate resin (PC resin), acrylic resin (PMMA resin), polypropylene resin (PP resin), polyethylene resin (PE resin), polystyrene resin (PS resin), polyamide resin (PA resin), polyethylene terephthalate resin (PET resin), fluororesin, vinyl chloride resin, epoxy resin, etc., which have high compatibility with the phosphite ester compound, can be used. Among them, polycarbonate resin and acrylic resin are more preferably used, because they have a particularly high compatibility with the phosphite ester compound and are easy to exhibit a desired effect of high temperature stability.

[c] Additive

The additive according to the present invention is added for the purpose of improving the weather resistance of the dispersion body according to the present invention and suppressing deterioration of electromagnetic wave absorption properties when the dispersion body is used for a long period of time. One or more weather resistance improvers selected from phosphoric acid stabilizers other than phosphite ester compounds, hindered phenol-based stabilizers, sulfide-based stabilizers, and metal deactivators may be added to the additive and used together.

1. Phosphite ester compound, 2. Phosphorus stabilizer other than phosphite ester compounds, 3. Hindered phenol-based stabilizer, 4. Sulfide-based stabilizer, 5. Metal deactivator, will be described hereafter in this order.

1. Phosphite Ester Compound

The phosphite ester are used in the compound of the present invention represented by structural formula (1) wherein R1, R2, R4 and R5 each independently represent a hydrogen atom, an alkyl group having 1 to 8 carbon atoms, an alicyclic group having 5 to 12 carbon atoms, an aralkyl group having 7 to 12 carbon atoms or an aromatic group.

Structural formula (1)

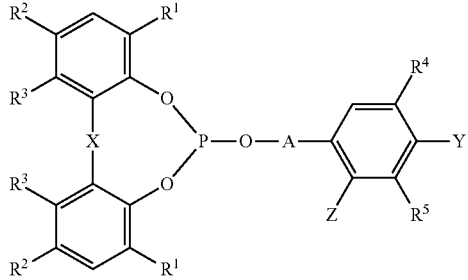

Examples of the alkyl group having 1 to 8 carbon atoms include for example: methyl group, ethyl group, n-propyl group, i-propyl group, n-butyl group, i-butyl group, sec-butyl group, t-butyl group, t-pentyl group, i-octyl group, t-octyl group, 2-ethylhexyl group, etc.

Examples of the alicyclic group having 5 to 12 carbon atoms include for example: cyclopentyl group, cyclohexyl group, cycloheptyl group, cyclooctyl group, 1-methylcyclopentyl group, 1-methylcyclohexyl group, 1-methyl-4-i-propylcyclohexyl group, etc.

Examples of the aralkyl group having 7 to 12 carbon atoms include for example: benzyl group, α-methylbenzyl group, α,α-dimethylbenzyl group, etc.

Examples of the aromatic group having 7 to 12 carbon atoms include for example: phenyl group, naphthyl group, 2-methylphenyl group, 4-methylphenyl group, 2,4-dimethylphenyl group, 2,6-dimethylphenyl group, etc.

R1, R2, and R4 are preferably an alkyl group having 1 to 8 carbon atoms, an alicyclic group having 5 to 12 carbon atoms, or the like.

R1 and R4 are more preferably a t-alkyl group such as a t-butyl group, a t-pentyl group and a t-octyl group, a cyclohexyl group and a 1-methylcyclohexyl group.

R2 is preferably an alkyl group having 1 to 5 carbon atoms such as methyl group, ethyl group, n-propyl group, i-propyl group, n-butyl group, i-butyl group, sec-butyl group, t-pentyl group, and further preferably methyl group, t-butyl group, t-pentyl group, etc.

R5 is a hydrogen atom, and is preferably an alkyl group having 1 to 5 carbon atoms such as methyl group, ethyl group, n-propyl group, i-propyl group, n-butyl group, i-butyl group, sec-butyl group, t-butyl group, t-pentyl group.

R3 is a hydrogen atom or an alkyl group having 1 to 8 carbon atoms. Examples of the alkyl group having 1 to 8 carbon atoms include an alkyl group having 1 to 8 carbon atoms similar to that described for R1, R2, R4, and R5. R5 is preferably a hydrogen atom or an alkyl group having 1 to 5 carbon atoms similar to that described for R2, and is further preferably a hydrogen atom, methyl group, etc.

X is a single bond, a sulfur atom or a divalent residue represented by structural formula (1-1). In the divalent residue represented by structural formula (1-1), R6 is a hydrogen atom, an alkyl group having 1 to 8 carbon atoms or an alicyclic group having 5 to 12 carbon atoms. Here, examples of the alkyl group having 1 to 8 carbon atoms and alicyclic group having 5 to 12 carbon atoms include alkyl groups and alicyclic groups similar to those described for R1, R2, R4 and R5 respectively.

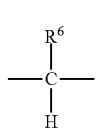

Structural formula (1-1)

R6 is a hydrogen atom or an alkyl group having 1 to 5 carbon atoms, and is preferably hydrogen atom, methyl group, ethyl group, n-propyl group, i-propyl group, n-butyl group, i-butyl group, etc.

X is preferably a single bond or a divalent residue represented by structural formula (1-1), and more preferably a single bond.

A is an alkylene group having 2 to 8 carbon atoms or a divalent residue represented by structural formula (1-2). A is preferably an alkylene group having 2 to 8 carbon atoms, and examples of the alkylene group include: ethylene group, propylene group, butylene group, pentamethylene group, hexamethylene group, octamethylene group, 2,2-dimethyl-1,3-propylene group, etc., and propylene group is further preferable.

Structural formula (1-2) shows that a divalent residue is bonded to an oxygen atom and a benzene nucleus, wherein * indicates that it is bonded to an oxygen atom.

R7 is a single bond or an alkylene group having 1 to 8 carbon atoms. Here, examples of the alkylene group having 1 to 8 carbon atoms include: methylene group, ethylene group, propylene group, butylene group, pentamethylene group, hexamethylene group, octamethylene group, 2,2-dimethyl-1,3-propylene group and the like can be mentioned. R7 is preferably a single bond, ethylene group, etc.

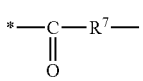

Structural formula (1-2)

One of Y and Z is a hydroxyl group, an alkyl group having 1 to 8 carbon atoms, an alkoxyl group having 1 to 8 carbon atoms, or an aralkyloxy group having 7 to 12 carbon atoms, and the other one is either a hydrogen atom or an alkyl group having 1 to 8 carbon atoms. Here, examples of the alkyl group having 1 to 8 carbon atoms include alkyl groups similar to those described for R1, R2, R4 and R5. Examples of the alkoxyl group having 1 to 8 carbon atoms include methoxy group, ethoxy group, n-propoxy group, i-propoxy group, n-butoxy group, i-butoxy group, sec-butoxy group, t-butoxy group, t-pentoxy group, i-octoxy group, t-octoxy group, 2-ethylhexoxy group, etc. Examples of the aralkyloxy group having 7 to 12 carbon atoms include benzyloxy group, α-methylbenzyloxy group, α,α-dimethylbenzyloxy group, etc.

In Y and Z, Y may be a hydroxyl group, an alkyl group having 1 to 8 carbon atoms, an alkoxyl group having 1 to 8 carbon atoms or an aralkyloxy group having 7 to 12 carbon atoms, and Z may be a hydrogen atom or an alkyl group having 1 to 8 carbon atoms, and Z may be a hydroxyl group, an alkyl group having 1 to 8 carbon atoms, an alkoxyl group having 1 to 8 carbon atoms, or an aralkyloxy group having 7 to 12 carbon atoms, and Y may be a hydrogen atom or an alkyl group having 1 to 8 carbon atoms.

Among the phosphite esters represented by structural formula (1), preferably, R1 and R4 are t-alkyl groups, cyclohexyl or 1-methylcyclohexyl groups, R2 is an alkyl group having 1 to 5 carbon atoms. R5 is a hydrogen atom or an alkyl group having 1 to 5 carbon atoms, R3 is a hydrogen atom or an alkyl group having 1 to 5 carbon atoms, X is a single bond, and A is an alkylene group having 2 to 8 carbon atoms.

Preferred specific examples of phosphite esters include 2,4,8,10-tetra-t-butyl-6-[3-(3-methyl-4-hydroxy-5-t-butylphenyl)propoxy]dibenzo[d,f][1,3,2]dioxaphosphepine [commercially available as Sumilizer (registered trademark) GP (manufactured by Sumitomo Chemical Co., Ltd.)], 2,10-dimethyl-4,8-di-t-butyl-6-[3-(3,5-di-t-butyl-4-hydroxyphenyl)propoxy]-12H-dibenzo[d,g][1,3,2]dioxaphosphocin, 2,4,8,10-tetra-t-butyl-6-[3-(3,5-di-t-butyl-4-hydroxyphenyl)propoxy]dibenzo[d,f][1,3,2]dioxaphosphepine, 2,4,8,10-tetra-t-pentyl-6-[3-(3,5-di-t-butyl-4-hydroxyphenyl)propoxy]-12-methyl-12H-dibenzo[d,g][1,3,2]dioxaphosphocin, 2,10-dimethyl-4,8-di-t-butyl-6-[3-(3,5-di-t-butyl-4-hydroxyphenyl)propionyloxy]-12H-dibenzo[d,g][1,3,2]dioxaphosphocin, 2,4,8,10-tetra-t-pentyl-6-[3-(3,5-di-t-butyl-4-hydroxyphenyl)propionyloxy]-12-methyl-12H-dibenzo[d,g][1,3,2]dioxaphosphocin, 2,4,8,10-tetra-t-butyl-6-[3-(3,5-di-t-butyl-4-hydroxyphenyl)propionyloxy]-dibenzo[d,f][1,3,2]dioxaphosphepine, 2,10-dimethyl-4,8-di-t-butyl-6-(3,5-di-t-butyl-4-hydroxybenzoyloxy)-12H-dibenzo[d,g][1,3,2]dioxaphosphocin, 2,4,8,10-tetra-t-butyl-6-(3,5-di-t-butyl-4-hydroxybenzoyloxy]-12-methyl-1 2H-dibenzo[d,g][1,3,2]dioxaphosphocin, 2,10-dimethyl-4,8-di-t-butyl-6-[3-(3-methyl-4-hydroxy-5-t-butylphenyl)propoxy]-12H-dibenzo[d,g][1,3,2]dioxaphosphocin, 2,4,8,10-tetra-t-butyl-6-[3-(3,5-di-t-butyl-4-hydroxyphenyl)propoxy]-12H-dibenzo[d,g][1,3,2]dioxaphosphocin, 2,10-diethyl-4,8-di-t-butyl-6-[3-(3,5-di-t-butyl-4-hydroxyphenyl)propoxy]-12H-dibenzo[d,g][1,3,2]dioxaphosphocin, and 2,4,8,10-tetra-t-butyl-6-[2,2-dimethyl-3-(3-t-butyl-4-hydroxy-5-methylphenyl)propoxy]-dibenzo[d,f][1,3,2]dioxaphosphepine.

Commercially available phosphite esters may also be used, and examples thereof include Sumilizer (registered trademark) GP (manufactured by Sumitomo Chemical Co., Ltd.).

An addition amount of the phosphite ester is more than 500 parts by mass and preferably 50,000 parts by mass or less, more preferably 2,000 parts by mass or more and 50,000 parts by mass or less, with respect to 100 parts by mass of the absorbing fine particles.

When the addition amount of the phosphite ester is more than 500 parts by mass with respect to 100 parts by mass of the absorbing fine particles, an increase in haze and transmittance in a high temperature atmosphere of 120° C. can be suppressed.

On the other hand, when the addition amount of the phosphite ester is 50000 parts by mass or less with respect to 100 parts by mass of the absorbing fine particles, deterioration of processability due to a change in melt viscosity of the resin and decrease in the visible light transmittance can be avoided.

An addition amount of the stabilizer of the phosphite ester in the dispersion body according to a conventional technique which does not contain absorbing fine particles is an amount equivalent to 50 parts by mass to 200 parts by mass when calculated on the assumption that the contained absorbing fine particles are 100 parts by mass, and this amount is significantly different from the addition amount of the present invention which is more than 500 parts by mass and 50,000 parts by mass or less.

Here, the present inventors found that the stabilizer of the phosphite ester exhibits an effect of improving the stability of the dispersion body within the above-described addition amount range only when the absorbing fine particles are simultaneously added.

Surprisingly, when the absorbing fine particles are not added, and when the addition amount of the phosphite ester stabilizer is more than 500 parts by mass and 50,000 parts by mass or less, hydrolysis of the resin, which is considered to be caused by the stabilizer, occurs in a humid heat atmosphere, and white clouding (white turbidity) occurs, which significantly deteriorates the stability of the dispersion body.

As disclosed in Patent Document 9, the phosphite ester according to the present invention exhibits excellent white clouding resistance in the humid heat atmosphere as compared with other phosphorus-based stabilizers. However, when the addition amount of the phosphite ester is in a large excess without adding the absorbing fine particles, white clouding will occur after all. Further, white clouding due to deterioration of the stability of the dispersion body is remarkable as compared with a case where no absorbing fine particles and no stabilizer are added.

2. Phosphorus Stabilizers Other than Phosphite Ester Compound

Examples of the phosphorus stabilizers other than the above-described phosphite esters include those having a phosphorus-containing functional group containing trivalent phosphorus represented by general formula (2), those having a phosphorus-containing functional group containing pentavalent phosphorus represented by general formula (3).

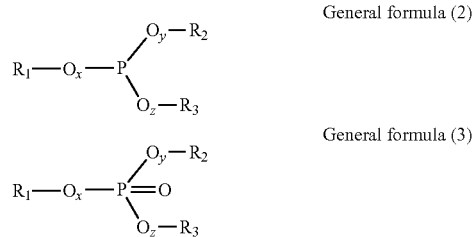

General formula (2)

General formula (3)

In general formulas (2) and (3), x, y, and z take a value of 0 or 1.

Further, R1, R2 and R3 are linear, cyclic or branched hydrocarbon groups represented by a general formula CmHn, halogen atoms such as fluorine, chlorine and bromine, or hydrogen atoms. Further, when y or z is 1. R2 or R3 may be a metal atom.

In the present embodiment, the "phosphorus-based functional group" means a part excluding R1 in general formulas (2) and (3) (that is, general formula:—$Ox$-$P(OyR_2)(OzR_3)$, or a general formula: represented by —$Ox$-$P(O)(OyR_2)(OzR_3)$). Examples of the phosphorus-based functional groups specifically include: phosphonic acid group (—$P(O)(OH)_2$), phosphoric acid group (—$OP(O)(OH)_2$), phosphonic acid ester group (—$P(O)(OR_2)(OR_3)$), phosphate ester group (—O—$P(O)(OR_2)(OR_3)$), phosphine group (—$P(R_2)(R_3)$), etc.

Among these phosphorus-based functional groups, functional groups containing pentavalent phosphorus, such as phosphonic acid groups, phosphoric acid groups, phosphonic acid ester groups and phosphoric acid ester groups, are considered to mainly have a chain initiation inhibition function (that is, a function of chelating metal ions by the adjacent phosphorus-based functional group).

On the other hand, phosphorus-containing functional groups containing trivalent phosphorus such as phosphine groups are considered to mainly have a peroxide decomposition function (that is, a function of decomposing peroxide into a stable compound by oxidation of P atom itself).

Among these phosphorus-based functional groups, phosphonic acid-based stabilizers having phosphonic acid groups are particularly suitable as an inhibitor for suppressing deterioration of electromagnetic wave absorption properties, because they can efficiently capture metal ions and are excellent in stability such as hydrolysis resistance.

Examples of a low molecular phosphorus stabilizer specifically include: phosphoric acid ($H_3PO_4$), triphenyl phosphite (($C_6H_5O)_3P$), trioctadecyl phosphite (($C_{18}H_{27}O)_3P$), tridecylphosphite (($C_{10}H_{21}O)_3P$), trilauryltrithiophosphite ($[CH_3(CH_2)_{11}S]_3P$), etc.

Further, suitable examples of the high molecular phosphorus stabilizer specifically include: polyvinyl phosphonic acid, polystyrene phosphonic acid, vinyl-based phosphoric acid (for example, acrylic phosphate ($CH_2$=$CHCOOPO(OH)_2$), vinyl alkyl phosphate ($CH_2$=$CHR$—$PO(OH)_2$. R is a polymer such as —$(CH_2)n$-), phosphonic acid group-introduced polyethersulfone resin, polyetheretherketone resin, linear phenol-formaldehyde resin, linear polystyrene resin, crosslinked polystyrene resin, linear poly(trifluorostyrene) resin, crosslinked (trifluorostyrene) resin, poly(2,3-diphenyl-1,4-phenylene oxide) resin, poly(allyl ether ketone) resin, poly(arylene ether sulfone) resin, Poly(phenylquinoxaline) resin, poly(benzylsilane) resin, polystyrene-graft-ethylene tetrafluoroethylene resin, polystyrene-graft-polyvinylidene fluoride resin, polystyrene-graft-tetrafluoroethylene resin, etc.

A commercial product can also be used for such a phosphoric acid-based stabilizer. For example, product name ADEKA STAB AS2112 (manufactured by ADEKA Corporation) and the like can be used.

3. Hindered Phenol-Based Stabilizer

An example of the hindered phenol-based stabilizer is a compound in which a large group such as a tert-butyl group is introduced at a 1-position of a phenolic OH group. The hindered phenol-based stabilizer is considered to have mainly a chain prohibition function (That is, a function such that phenolic OH group captures radicals and suppresses chain reaction due to radicals).

Preferable specific examples of the low molecular hindered phenol-based stabilizers include: 2,6-tert-butyl-p-cresol, 2,6-di-tert-butyl-phenol, 2,4-di-methyl-6-tert-butylphenol, butylhydroxyanisole, 2,2'-methylenebis(4-methyl-6-tert-butylphenol), 4,4'-butylidene bis(3-methyl-6-tert-butylphenol), 4,4'-thiobis(3-methyl-6-tert-butylphenol), tetrakis[methylene-3(3,5-di-tert-butyl-4-hydroxyphenyl) propionate]methan e, 1,1,3-tris(2-methyl-4-hydroxy-5-tert-butylphenyl)butane, etc.

Further, preferable specific examples of high molecular hindered phenol-based stabilizers include: polymers of vinyl, acryl, methacryl, styryl, and other monomers having the hindered phenol-based stabilizers in the side chain, and a polymer in which the structure of the low molecular hindered phenol-based stabilizer described above is incorporated in the main chain, etc.

High molecular compounds may be preferred over low molecular compounds, and when using the high molecular compounds, a crosslinked structure may be further introduced. This is the same as in the case of the phosphorus-based stabilizer.

However, there are many unclear points about a harmful radical capturing process of the above-described various stabilizers, and there is a possibility that an action other than those described above is working, and the action and effect are not limited to those described above.

A commercial product can also be used as the hindered phenol-based stabilizer, such as Irganox 1010 (product name) (manufactured by BASF) and the like.

4. Sulfide-Based Stabilizer

Examples of the sulfide-based stabilizer include compounds having divalent sulfur in the molecule (sometimes referred to as "sulfur-based stabilizer" in the present invention).

The sulfur-based stabilizer is considered to have mainly a peroxide decomposition function (that is, the function of decomposing peroxide into a stable compound by oxidation of S atom itself). Suitable examples of the low molecular sulfur-based stabilizers include: dilauryl thiodipropionate ($S(CH_2CH_2COOC_{12}H_{25})_2$), distearyl thiodipropionate ($S(CH_2CH_2COOC_{18}H_{37})_2$), lauryl stearyl thiodipropionate ($S(CH_2CH_2CO)OC_{18}H_{37})(CH_2CH_2COOC_{12}H_{25})$), dimyristylthiodipropionate ($S(CH_2CH_2COOC_{14}H_{29})_2$), distearyl $\beta,\beta'$-thiodibutyrate ($S(CH(CH_3)CH_2COOC_{18}H_{39})_2$), 2-mercaptobenzimidazole ($C_6H_4NHNCSH$), dilauryl sulfide ($S(C_{12}H_{25})_2$), etc.

A commercial product can also be used as such a sulfide-based stabilizer, such as Sumilizer (trade name) (registered trademark) TPM (manufactured by Sumitomo Chemical Co., Ltd.) and the like.

5. Metal Deactivator

As the metal deactivator, hydrazine derivatives, salicylic acid derivatives, oxalic acid derivatives and the like are preferably used, and particularly 2',3-bis[[3-[3,5-di-tert-butyl-4-hydroxyphenyl]propionyl]]propionohydrazide, 2-hydroxy-N-(2H-1,2,4-triazole-3-yl)benzamide, dodecanedioic acid bis[2-(2-hydroxybenzoyl)hydrazide] etc., are preferable.

The addition amount of the metal deactivator added to the dispersion liquid or the dispersion body varies depending on a required performance and a kind and an amount of other additive used in combination, and therefore is not particularly limited. However, the addition amount is preferably 1 to 10 parts by mass, more preferably 3 to 8 parts by mass, with respect to 100 parts by mass of the absorbing fine particles in the dispersion liquid or the dispersion body. When the addition amount of the metal deactivator is 1 part by mass or more, the effect of preventing the infrared absorption function from being deteriorated is recognized, and the effect is almost saturated at 10 parts by mass.

[d] Dispersant

In the dispersion liquid according to the present invention, a dispersant can be used in order to uniformly disperse the absorbing fine particles in the medium and/or the dispersion liquid.

Various kinds of dispersants can be selected depending on the above-described medium. Then, since the absorbing fine particles described in the present invention are the tungsten oxide fine particles represented by the general formula $W_yO_z$ and the composite tungsten oxide fine particles represented by the general formula $M_xW_yO_z$, a dispersant having an amino group, an epoxy group, a carboxyl group, a hydroxyl group, a sulfo group or the like as a functional group is preferable. These functional groups are adsorbed on the surface of the absorbing fine particles, prevent the absorbing fine particles from aggregating, and have the effect of uniformly dispersing the absorbing fine particles even in the medium of the dispersion body.

Further, an acrylic-styrene copolymer-based dispersant having a functional group is also a preferable dispersant. Among them, more preferable examples are an acrylic-styrene copolymer dispersant having a carboxyl group as a functional group, and an acrylic dispersant having an amine-containing group as a functional group. The dispersant having a group containing an amine as a functional group preferably has a molecular weight Mw of 2,000 to 200,000 and an amine value of 5 to 100 mgKOH/g. Further, the dispersant having a carboxyl group preferably has a molecular weight Mw of 2,000 to 200,000 and an acid value of 1 to 50 mgKOH/g.

Preferable specific examples of commercially available dispersants include: SOLSPERSE (registered trademark) (the same applies hereinafter) 3000, 5000, 9000, 11200, 12000, 13000, 13240, 13650, 13940, 16000, 17000, 18000, 20000, 21000, 24000SC, 24000GR, 26000, 27000, 28000, 31845, 32000, 32500, 32550, 32600, 33000, 33500, 34750, 35100, 35200, 36600, 37500, 38500, 39000, 41000, 41090, 53095, 55000, 56000, 71000, 76500, J180, J200, M387, etc., SOLPLUS (registered trademark) (hereinafter the same) D510, D520, D530, D540, DP310, K500, L300, L400, R700, etc., manufactured by Japan Lubrizol Corporation; Disperbyk (registered trademark) (the same applies hereinafter)-101, 102, 103, 106, 107, 108, 109, 110, 111, 112, 116, 130, 140, 142, 145, 154, 161, 162, 163, 164, 165, 166, 167, 168, 170, 171, 174, 180, 181, 182, 183, 184, 185, 190, 191, 192, 2000, 2001, 2009, 2020, 2025, 2050, 2070, 2095, 2096, 2150, 2151, 2152, 2155, 2163, 2164, Anti-Terra (registered trademark) (the same applies hereinafter) -U, 203, 204 etc.; BYK (registered trademark) (the same applies hereinafter)-P104, P104S, P105, P9050, P9051, P9060, P9065, P9080, 051, 052, 053, 054, 055, 057, 063, 065, 066N, 067A, 077, 088, 141, 220S, 300, 302, 306, 307, 310, 315, 320, 322, 323, 325, 330, 331, 333, 337, 340, 345, 346, 347, 348, 350, 354, 355, 358N, 361N, 370, 375, 377, 378, 380N, 381, 392, 410, 425, 430, 1752, 4510, 6919, 9076, 9077, W909, W935, W940, W961, W966, W969, W972, W980, W985, W995, W996, W9010, Dynwet800, Silicon3700, UV3500, UV3510, UV3570, etc., manufactured by Big Chemie Japan; EFKA (registered trademark) (the same applies hereinafter) 2020, 2025, 3030, 3031, 3236, 4008, 4009, 4010, 4015, 4020, 4046, 4047, 4050, 4055, 4060, 4080, 4300, 4310, 4320, 4330, 4340, 4400, 4401, 4402, 4403, 4500, 5066, 5220, 6220, 6225, 6230, 6700, 6780, 6782, 7462, 8503, etc., manufactured by Ffka Additives; JONCRYL (registered trademark) (the same applies hereinafter) 67, 678, 586, 611, 680, 682, 690, 819, -JDX5050, etc., manufactured by BASF Japan; TERPLUS (registered trademark)

(the same applies hereinafter) MD1000, D1180, D1130, etc., manufactured by Otsuka Chemical Co., Ltd.; Addispar (registered trademark) (the same applies hereinafter) PB-711, PB-821, PB-822, etc., manufactured by Ajinomoto Fine Techno; Dispalon (registered trademark) (hereinafter the same) 1751N, 1831, 1850, 1860, 1934, DA-400N. DA-703-50, DA-325, DA-375, DA-550, DA-705. DA-725, DA-1401, DA-7301, DN-900, NS-5210, NVI-8514L, etc., manufactured by Kusumoto Chemicals; Alphon (registered trademark) (hereinafter the same) UH-2170, UC-3000, UC-3910, UC-3920, UF-5022, UG-4010. UG-4035, UG-4040, UG-4070. Reseda (registered trademark) (the same applies hereinafter) GS-1015. GP-301. GP-301S, etc., manufactured by Toagosei Co., Ltd.; Dianal (registered trademark) (the same applies hereinafter) BR-50. BR-52, BR-60, BR-73, BR-77, BR80, BR-83, BR85, BR87, BR88, BR-90, BR-96, BR102, BR-113, BR116, etc., manufactured by Mitsubishi Chemical Corporation.

The addition amount of the dispersant is different depending on the kind of the absorbing fine particles and the dispersant, but is preferably in a range of 10 parts by mass to 1000 parts by mass with respect to 100 parts by mass of the absorbing fine particles.

This is because when the addition amount of the dispersant is in the above range, the absorbing fine particles are uniformly dispersed in the medium and do not adversely affect physical properties of the electromagnetic wave absorption to be obtained.

[e] Dispersion Liquid

The dispersion liquid according to the present invention is obtained by mixing and dispersing the absorbing fine particles in the liquid medium described above.

A method for dispersing the absorbing fine particles is not particularly limited as long as it is a method of uniformly dispersing the fine particles in the dispersion liquid. Further, the above method is preferable because the absorbing fine particles can be dispersed while controlling the above-described preferable dispersed particle size, as long as the absorbing fine particles can be pulverized simultaneously with dispersion.

Specific methods of the pulverization and dispersion treatment include for example: a pulverization/dispersion treatment method using devices such as bead mill, ball mill, sand mill, paint shaker, ultrasonic homogenizer. Among them, pulverizing and dispersing with a medium stirring mill such as a bead mill, a ball mill, a sand mill, and a paint shaker using medium media such as beads, balls and Ottawa sand, is preferable because the time to reach a desired dispersed particle size is short.

When it is important to reduce scattering of light due to the absorbing fine particles, the dispersed particle size of the absorbing fine particles is preferably 200 nm or less, preferably 100 nm or less. This is because when the dispersed particle size of the dispersed particles is small, the scattering of light in the visible light region of wavelength 400 nm to 780 nm due to geometrical scattering or Mie scattering is reduced. As a result of reducing the scattering of the light, the following situation can be avoided: the electromagnetic wave absorbing film becomes frosted glass and clear transparency cannot be obtained.

This is because when the dispersed particle size of the absorbing fine particles is 800 nm or less, geometric scattering or Mie scattering is reduced, and a Rayleigh scattering region is set. Then, in the Rayleigh scattering region, since scattered light is reduced in proportion to the sixth power of a particle size, the scattering is reduced as the dispersed particle size is reduced, and the transparency is improved.

Further, when the dispersed particle size is 200 nm or less, scattered light is extremely small, which is preferable, and when it is 100 nm or less, it is more preferable. From a viewpoint of avoiding light scattering, it is preferable that the dispersed particle size is small. On the other hand, when the dispersed particle size is 10 nm or more, industrial production is easy.

The dispersed particle size can be confirmed by sampling a dispersion liquid and measuring it with various commercially available particle size measuring devices. As the particle size measuring device, for example, a known measuring device such as ELS-8000 manufactured by Otsuka Electronics Co., Ltd. based on the principle of a dynamic light scattering method can be used.

The dispersion liquid according to the present invention is used for various applications utilizing photothermal conversion.

For example, a curable ink composition can be obtained by adding the surface-treated infrared absorbing fine particles to uncured thermosetting resin, or by adding the surface-treated infrared absorbing fine particles to uncured thermosetting resin after dispersing the surface-treated infrared absorbing fine particles according to the present invention in an appropriate solvent. The curable ink composition is provided on a predetermined substrate, and has excellent adhesion to the substrate when cured by irradiation with infrared light. In addition, the curable ink composition according to the present invention is suitable for stereolithography including: coating the substrate with a predetermined amount of the ink composition; irradiating the coated matter with near-infrared light, curing the coated matter to heap up; and forming a three-dimensional object to be described later, in addition to conventional ink applications.

[f] Dispersion Body

A masterbatch, which is one of the forms of a dispersion body, can be obtained by dispersing the absorbing fine particles in the resin, then, pelletizing the resin. On the other hand, the masterbatch can also be obtained by processing it into pellets by a common method of uniformly mixing the absorbing fine particles with powder or pellets of the medium resin and, if necessary, other additives, then, kneading with a vented single-screw or twin-screw extruder, and cutting melt extruded strands. In this case, examples of the shape of the masterbatch include a columnar shape and a prismatic shape. Further, it is also possible to adopt a so-called hot cut method of directly cutting a melt extrudate. In this case, the masterbatch generally takes a shape close to a sphere. Note that the masterbatch is an example of the dispersion body according to the present invention.

In the production process of the masterbatch described above, it is preferable to remove the liquid medium contained in the dispersion liquid to the extent that it can remain in the masterbatch. Further, it is also preferable that in the production process of the masterbatch, absorbing fine particles obtained by removing a liquid medium from a dispersion liquid containing a dispersant or liquid resin, are used as absorbing fine particles mixed with medium resin. Further, it is also preferable to use a powdery absorbing fine particle dispersion powder containing a solid content of the dispersion liquid or liquid resin by removing the liquid medium from the dispersion liquid containing the dispersant and liquid resin, etc., while applying mechanical processing. This is because a powdery state makes it easy to mix the absorbing fine particle dispersion powder and the powdery or pelletized medium resin, and easy to adjust a concentration of the absorbing fine particles in the masterbatch with high accuracy. Note that the absorbing fine particle dispersion powder is an example of the dispersion body according to the present invention. The dispersion concentration of the obtained masterbatch can be adjusted while maintaining a dispersion state of the absorbing fine particles contained in the dispersion body by adding the medium resin and kneading.

On the other hand, after the monomer, oligomer and uncured liquid medium resin precursor of the medium resin are mixed with the absorbing fine particles to obtain a dispersion liquid, the monomer or the like may be cured by a chemical reaction such as condensation or polymerization. For example, when acrylic resin is used as the medium resin, an acrylic monomer or an acrylic UV curable resin is mixed with the absorbing fine particles to obtain a dispersion liquid. Then, a dispersion body using the acrylic resin can be obtained by filling the dispersion liquid in a predetermined template and performing radical polymerization.

When a resin that cures by crosslinking, such as an ionomer resin, is used as the resin medium, a dispersion body can be obtained by subjecting the dispersion liquid to a crosslinking reaction, as in the case of using the acrylic resin described above.

Further, a dispersion liquid for plasticizer is obtained by mixing the absorbing fine particles and the liquid plasticizer.

The obtained plasticizer dispersion liquid is mixed with the medium resin and is subjected to a well-known heat treatment, etc., and the liquid medium is removed to the extent that it can remain in the dispersion body, to thereby obtain a dispersion body. When the liquid plasticizer is used as the liquid medium, an entire amount of the liquid plasticizer may remain in the dispersion body.

Further, any one of the absorbing fine particles according to the present invention, the plasticizer dispersion liquid, the masterbatch, the absorbing fine particle dispersion powder, and the thermoplastic resin, and the plasticizer and other additives as desired, are kneaded to obtain a kneaded product. From this kneaded product, for example, it is possible to produce a sheet-like, board-like, or film-like dispersion body formed into a flat surface or a curved surface, by known methods such as extrusion molding and injection molding.

A known method can be used for forming the sheet-like, board-like, or film-like dispersion body. For example, a calender roll method, an extrusion method, a casting method, an inflation method or the like can be used.

The dispersion body according to the present invention can be applied to various uses by processing it into a sheet, board or film-like state. By interposing the sheet, board or film-like dispersion body as a composing member of an intermediate layer sandwiched between multiple transparent substrates made of plate glass or plastic material of two or more transparent substrates that transmit at least visible light, an electromagnetic wave absorbing laminated structure can be obtained, which has an electromagnetic wave absorbing function while transmitting visible light. The electromagnetic wave absorbing intermediate film is an example of the dispersion body according to the present invention.

Further, the absorbing fine particle dispersion liquid according to the present invention is mixed with a liquid medium such as a liquid resin or a high molecular monomer to prepare a coating liquid. When a coating layer is formed on a transparent substrate selected from a substrate film or a substrate glass by a known method using the above coating liquid, an electromagnetic wave absorbing film or an electromagnetic wave absorbing glass in which absorbing fine particles are dispersed in a solid medium can be produced. Examples of a method for forming the coating layer include spin coating, bar coating, spray coating, dip coating, screen coating, roll coating, and flow coating, and any method may be used as long as the dispersion liquid can be applied evenly and thinly. After applying the dispersion liquid by the method described above, volatile components are volatilized by standing still in the air or vacuum at room temperature or under heating. The dispersion body can be obtained by irradiation of ultraviolet rays when the dispersion liquid contains, for example, an ultraviolet curable resin, or by fixing the layer on the substrate by further heating or the like when the dispersion liquid contains a thermosetting resin. Further, it is acceptable to obtain a coating layer formed by an inkjet method or a patterned coating layer formed by a 3D printer. The electromagnetic wave absorbing film or the electromagnetic wave absorbing glass is an example of the absorbing fine particle dispersion body according to the present invention.

Further, since the absorbing fine particles according to the present invention have absorption in the infrared region, and therefore absorb infrared light with specific wavelength, when a printing surface containing the surface-treated infrared absorbing fine particles is irradiated with an infrared laser. Accordingly, an anti-counterfeit printed matter obtained by printing an anti-counterfeit ink containing the absorbing fine particles on one side or both sides of a substrate to be printed, can judge an authenticity of the printed matter by irradiating infrared light having a specific wavelength and reading a difference in an amount of reflection or transmission. The anti-counterfeit printed matter is an example of the absorbing fine particle dispersion body according to the present invention.

Further, a light-to-heat conversion layer can be formed by producing an ink by mixing the dispersion liquid according to the present invention and a binder component, coating a substrate with this ink and drying the ink, then, curing the dried ink. The light-to-heat conversion layer can emit heat only at a desired position with high position accuracy by irradiation of an electromagnetic wave laser such as infrared light, and applicable in a wide range of fields such as electronics, medical care, agriculture, machinery and the like, and can be used for example, a donor sheet used when forming an organic electroluminescence device by a laser transfer method, and thermal paper for thermal printers and ink ribbon for thermal transfer printers. The light-to-heat conversion layer is an example of the dispersion body according to the present invention.

Further, by dispersing the absorbing fine particles according to the present invention in an appropriate medium and containing the dispersion material on the surface and/or the inside of the fiber, an electromagnetic wave absorbing fiber is obtained. By having the above structure, the electromagnetic wave absorbing fiber efficiently absorbs near infrared rays and the like from sunlight due to containing of the absorbing fine particles, and becomes an electromagnetic wave absorbing fiber excellent in heat retention, and at the same time, transmits light in the visible light region, and therefore the electromagnetic wave absorbing fiber has excellent design, and as a result, can be used for various applications such as clothing for cold weather, clothing for sports, stockings, curtains and other textile products that require heat retention and other industrial textile products. The electromagnetic wave absorbing fiber is an example of the dispersion body according to the present invention.

Further, the film-like or board-like dispersion body according to the present invention can be applied to materials used for roofs and outer wall materials of agricultural and horticultural houses, and can be used as a thermal insulation material for agricultural and horticultural facilities with thermal insulation properties by transmitting visible light and securing light necessary for photosynthesis of plants in the agricultural and horticultural house, and efficiently absorbing other light such as near-infrared light included in the sunlight. The heat insulating material for agricultural and horticultural facilities is an example of the infrared absorbing fine particle dispersion body according to the present invention.

[g] Conclusion

As described above, according to the present invention, transparent window materials and roofing materials can be produced at low cost, that withstands long-term use in general outdoor environments, has long-term high-temperature stability, and exhibits an excellent heat ray shielding effect. In addition, when using a molded body obtained by mixing the transparent resin with the dispersion liquid according to the present invention without using glass for the member, the heat insulating material for agricultural and horticultural facilities can also have an excellent heat ray shielding effect, in addition to impact resistance and lightness that cannot be obtained with glass. Further, the dispersion body produced using the dispersion liquid according to the present invention can be obtained by a method of dry blending masterbatch during molding, the masterbatch being made from the dispersion liquid, or an inexpensive production method such as adding the dispersion liquid directly to the medium. Further, even though the dispersion body is transparent, it can convert light such as laser light and infrared light into heat, so it works effectively for joining members together.

The member used in the present invention will lead to energy reduction as a result, in various applications such as reduction of electric power required for air conditioning such as air conditioners and reduction of fuel consumption/electricity cost by reducing a weight of moving objects.

EXAMPLES

The present invention will be specifically described hereafter, with reference to examples. However, the present invention is not limited to the following examples.

For a measurement of the crystallite size of the absorbing fine particles in Examples and Comparative Examples, the absorbing fine particles obtained by removing the liquid medium from the dispersion liquid were used. Then, X-ray diffraction pattern of the absorbing fine particles was measured by powder X-ray diffraction (0-20 method) using a powder X-ray diffractometer (X'Pert-PRO/MPD manufactured by SPECTALIS, Inc., PANalytical), and the crystallite size was calculated from the obtained X-ray diffraction pattern using the Rietveld method.

Further, optical properties of infrared absorbing sheets according to Examples and Comparative examples were measured using a spectrophotometer (U-4100 manufactured by Hitachi Ltd.), and visible light transmittance and solar radiation transmittance were calculated according to JISR3106.

Further, a haze in Examples and Comparative Examples was measured according to JISK7105 using a haze meter (HM-150 manufactured by Murakami Color Co., Ltd.).

Example 1

5 mass % of hexagonal cesium tungsten bronze powder CWO with Cs/W (molar ratio)=0.33 (registered trademark) (YM-01 manufactured by Sumitomo Metal Mining Co., Ltd.) and 5 mass % of polyacrylate dispersant and 90 mass % of toluene were mixed to obtain a mixture, and the mixture was charged into a paint shaker containing 0.3 mm$\varphi$ZrO$_2$ beads, and pulverized and dispersed for 10 hours. Then, 2000 parts by mass of Sumilizer (registered trademark) GP (manufactured by Sumitomo Chemical Co., Ltd.) (structural formula (2)) was added with respect to 100 parts by mass of the above hexagonal cesium tungsten bronze, and the mixture was stirred and mixed, to obtain a dispersion liquid according to Example 1. Here, the crystallite size of the absorbing fine particles in the obtained dispersion liquid was measured and found to be 32 nm.

The liquid medium was evaporated from the dispersion liquid according to Example 1 by vacuum fluidization drying, to obtain an absorbing fine particle dispersion powder (sometimes referred to as "dispersion powder" in the present invention) according to Example 1. For the vacuum fluidized drying, Ishikawa type stirring and crushing machine 24P manufactured by Ishikawa factory was used, and an atmosphere in the apparatus was vacuum, the temperature was 50° C., and a rotation speed of a pestle was 40 rpm. The above-described dispersion powder is an example of the dispersion body according to the present invention.

The dispersion powder according to Example 1 and polycarbonate resin were uniformly mixed using a blender so that a concentration of the absorbing fine particles was 0.05 mass %, then, kneaded at 290° C. using a twin screw extruder, extruded from a T-die and made into a 0.75 mm thick sheet material by a calender roll method, to obtain an infrared absorbing sheet according to Example 1. The infrared absorbing sheet is an example of the dispersion body according to the present invention.

Optical properties of the obtained infrared absorbing sheet according to Example 1 were measured, and a visible light transmittance was 79.6%, a solar radiation transmittance was 48.6%, and a haze was 0.9%.

Subsequently, after the infrared absorption sheet according to Example 1 was kept in an air atmosphere at 120° C. for 30 days, a change in visible light transmittance and a change in solar radiation transmittance were measured. The change in visible light transmittance was +0.6%, and the change in solar radiation transmittance was +1.4%.

Further, after exposing the infrared absorbing sheet according to Example 1 to a humid heat atmosphere of 85° C. and 90% for 9 days, the change in visible light transmittance and the change in solar radiation transmittance were measured. The change in visible light transmittance was +2.1%, and the change in solar radiation transmittance was +3.7%.

Tables 1 and 2 show the results. Tables 1 and 2 also show the results obtained in Examples 2 to 7 and Comparative Examples 1 to 5.

Examples 2 and 3

Dispersion liquids and infrared absorbing sheets according to Examples 2 and 3 were obtained in the same manner as in Example 1, except that 4000 parts by mass (Example 2) or 700 parts by mass (Example 3) of Sumilizer GP was added with respect to 100 parts by mass of hexagonal cesium tungsten bronze powder.

Optical properties of the obtained dispersion liquids and infrared absorbing sheets according to Examples 2 and 3 were evaluated in the same manner as in Example 1. Tables 1 and 2 show production conditions and evaluation results according to Examples 2 and 3.

Example 4

The dispersion powder according to Example 1 and polycarbonate resin were mixed uniformly using a blender so that an addition amount of SumilizerGP was 50000 parts by mass with respect to 100 parts by mass of hexagonal cesium tungsten bronze powder, and a concentration of fine particles was 0.05 mass %, then, melt and kneaded using a twin-screw extruder, and extruded strands were cut into pellets, to obtain a masterbatch containing absorbing fine particles. The masterbatch containing absorbing fine particles is an example of the dispersion body according to the present invention.

10 parts by mass of the obtained masterbatch containing absorbing fine particles according to Example 4 and 90 parts by mass of polycarbonate resin pellets were dry blended, to form a plate material having a thickness of 10 mm using an injection molding machine, to obtain an infrared absorbing plate according to Example 4. The infrared absorbing plate is an example of the dispersion body according to the present invention.

Optical properties of the obtained infrared absorbing plate according to Example 4 were evaluated in the same manner as in Example 1. Tables 1 and 2 show production conditions and evaluation results according to Example 4.

Example 5

5 mass % of hexagonal cesium tungsten bronze powder with Cs/W (molar ratio)=0.33 (Sumitomo Metal Mining Co., Ltd.), 5 mass % of polyacrylate dispersant, and 90 mass % of toluene were mixed, and the obtained mixture was charged into a paint shaker containing 0.3 mmφ$ZrO_2$ beads, and pulverized and dispersed for 10 hours. Then, 1500 parts by mass of SumilizerGP (structural formula (2)) and 150 parts by mass of IRGANOX 1010 were added with respect to 100 parts by mass of the above hexagonal cesium tungsten bronze, and mixed while stirring, to obtain a dispersion liquid according to Example 5.

An infrared absorbing sheet according to Example 5 was obtained in the same manner as in Example 1, except that the dispersion liquid according to Example 5 was used in place of the dispersion liquid according to Example 1.

The crystallite size of the absorbing fine particles in the obtained dispersion liquid according to Example 5 and the optical properties of the infrared absorbing sheet were measured and evaluated in the same manner as in Example 1. Tables 1 and 2 show production conditions and evaluation results according to Example 5.

Example 6

A dispersion liquid and an infrared absorbing sheet according to Example 6 were obtained in the same manner as in Example 5, except that ADEKA STAB 2112 was used in place of IRGANOX 1010.

The crystallite size of the absorbing fine particles in the obtained dispersion liquid according to Example 6 and the optical properties of the infrared absorbing sheet were measured and evaluated in the same manner as in Example 1. Tables 1 and 2 show production conditions and evaluation results according to Example 6.

Example 7

A dispersion liquid and an infrared absorbing sheet according to Example 7 were obtained in the same manner as in Example 1, except that $W_{18}O_{49}$ in Magneli phase was used in place of the hexagonal cesium tungsten bronze powder (manufactured by Sumitomo Metal Mining Co., Ltd.).

The crystallite size of the absorbing fine particles in the obtained dispersion liquid according to Example 7 and the optical properties of the infrared absorbing sheet were measured and evaluated in the same manner as in Example 1. Tables 1 and 2 show production conditions and evaluation results according to Example 7.

Example 8

A dispersion liquid and an infrared absorbing sheet according to Example 8 were obtained in the same manner as in Example 1, except that acrylic resin was used in place of polycarbonate resin, acrylic resin pellets were used in place of polycarbonate resin pellets, and the kneading temperature in the twin-screw extruder was changed to 230° C.

The crystallite size of the absorbing fine particles in the obtained dispersion liquid according to Example 8 and the optical properties of the infrared absorbing sheet were measured and evaluated in the same manner as in Example 1. Tables 1 and 2 show production conditions and evaluation results according to Example 8.

Comparative Example 1

A dispersion liquid and an infrared absorption sheet according to Comparative Example 1 were obtained in the same manner as in Example 1, except that nothing was added in place of SumilizerGP.

The crystallite size of the absorbing fine particles in the obtained dispersion liquid and the optical properties of the infrared absorbing sheet according to Comparative Example 1 were measured and evaluated in the same manner as in Example 1. Tables 1 and 2 show production conditions and evaluation results according to Comparative Example 1.

Comparative Example 2

A dispersion liquid and an infrared absorbing sheet according to Comparative Example 2 were obtained in the same manner as in Example 1, except that 500 parts by mass of Sumilizer GP was added with respect to 100 parts by mass of hexagonal cesium tungsten bronze powder.

The crystallite size of the absorbing fine particles in the dispersion liquid obtained in Comparative Example 2 and the optical properties of the infrared absorbing sheet were measured and evaluated in the same manner as in Example 1. Tables 1 and 2 show production conditions and evaluation results according to Comparative Example 2.

Comparative Examples 3 and 4

Dispersion liquids and infrared absorbing sheets according to Comparative Examples 3 and 4 were obtained in the same manner as in Example 1, except that IRGANOX 1010 was added in place of Sumilizer GP (Comparative Example 3), ADEKA STAB 2112 was added in place of 300 parts by mass of SumilizerGP (Comparative Example 4) with respect to 100 parts by mass of hexagonal cesium tungsten bronze powder.

The crystallite size of the absorbing fine particles in the dispersion liquids obtained in Comparative Examples 3 and 4 and the optical properties of the infrared absorbing sheet were measured and evaluated in the same manner as in Example 1. Tables 1 and 2 show production conditions and evaluation results according to Comparative Examples 3 and 4.

Comparative Example 5

A dispersion liquid and an infrared absorbing sheet according to Comparative Example 5 were obtained in the same manner as in Example 7 except that nothing was added in place of SumilizerGP.

The crystallite size of the absorbing fine particles in the obtained dispersion liquid according to Comparative Example 5 and the optical properties of the infrared absorbing sheet were measured and evaluated in the same manner as in Example 1. Tables 1 and 2 show production conditions and evaluation results according to Comparative Example 5.

Comparative Example 6

Nothing was added in place of the dispersion powder, and Sumilizer GP was added in the same amount as in Example 1 to obtain a resin sheet according to Comparative Example 6. That is, the resin sheet according to Comparative Example 6 is a resin sheet containing no absorbing fine particles and containing only a stabilizer of SumilizerGP (structural formula (2)).

The optical properties of Comparative Example 6 thus obtained were measured and evaluated in the same manner as in Example 1. Then, it was found that the resin sheet which was transparent before the test became cloudy and became opaque after being left standing in a humid heat atmosphere of 85° C., and 90% for 9 days. Tables 1 and 2 show production conditions and evaluation results according to Comparative Example 6.

Comparative Example 7

A resin sheet according to Comparative Example 7 was obtained in the same manner as in Example 1, except that nothing was added in place of SumilizerGP, and nothing was added in place of the dispersion powder. That is, the resin sheet according to Comparative Example 7 contains neither absorbing fine particles nor additives such as SumilizerGP.

The obtained resin sheet according to Comparative Example 7 was measured and evaluated in the same manner as in Example 1. Then, it was found that the resin sheet according to Comparative Example 7 shows almost no change in the optical properties after being kept in a 120° C. air bath for 30 days or after being left still in a humid heat atmosphere of 85° C. and 90% for 9 days. Tables 1 and 2 show production conditions and evaluation results according to Comparative Example 7.

Comparative Example 8

A dispersion liquid and an infrared absorbing sheet according to Comparative Example 8 were obtained in the same manner as in Example 8, except that nothing was added in place of SumilizerGP.

The crystallite size of the absorbing fine particles in the obtained dispersion liquid of Comparative Example 8 and the optical properties of the infrared absorbing sheet were measured and evaluated in the same manner as in Example 1. Tables 1 and 2 show production conditions and evaluation results according to Comparative Example 8.

CONCLUSION

The infrared absorbing sheet or the infrared absorbing plate produced from the dispersion liquids according to Examples 1 to 8 had excellent heat ray shielding properties and excellent stability not only in high temperature but also in high-temperature and high-humidity holding environments.

TABLE 1

| | Infrared absorbing fine particles | | Additive | | | | |
|---|---|---|---|---|---|---|---|
| | Kind | Crystallite size [nm] | Kind | Addition amount * [Parts by mass] | Kind | Addition amount * [Parts by mass] | Medium resin |
| Example 1 | Hexagonal cesium tungsten bronze | 32 | Sumilizer GP | 2000 | — | — | Polycarbonate |
| Example 2 | | 32 | | 4000 | — | — | |
| Example 3 | | 32 | | 700 | — | — | |
| Example 4 | | 32 | | 50000 | — | — | |
| Example 5 | | 32 | | 1500 | IRGANOX 1010 | 150 | |
| Example 6 | | 32 | | 1500 | ADEKA STAB 2112 | 150 | |
| Example 7 | $W_{18}O_{49}$ | 32 | | 2000 | — | — | |
| Example 8 | Hexagonal casium tungsten bronze | 32 | | 2000 | — | — | Acryl |
| Comparative Example 1 | Hexagonal cesium tungsten bronze | 32 | — | — | — | — | Polycarbonate |
| Comparative Example 2 | | 32 | Sumilizer GP | 500 | — | — | |
| Comparative Example 3 | | 32 | IRGANOX 1010 | 300 | — | — | |
| Comparaive Example 4 | | 32 | ADEKA STAB 2112 | 300 | — | — | |
| Comparative Example 5 | $W_{18}O_{49}$ | 32 | — | — | — | — | |
| Comparative Example 6 | — | — | Sumilizer GP | 2000 | — | — | |
| Comparative Example 7 | — | — | — | — | — | — | |

TABLE 1-continued

| | Infrared absorbing fine particles | | Additive | | | | |
|---|---|---|---|---|---|---|---|
| | Kind | Crystallite size [nm] | Kind | Addition amount * [Parts by mass] | Kind | Addition amount * [Parts by mass] | Medium resin |
| Comparative Example 8 | Hexagonal cesium tungsten bronze | 32 | — | — | — | — | Acryl |

Addition amount *: addition amount of additive with respect to 100 parts by mass or infrared absorbing fine particles

TABLE 2

| | Infrared absorbing sheet or infrared absorbing plate | | | | | | | |
|---|---|---|---|---|---|---|---|---|
| | | Visible light | Solar radiation | | In air atmosphere of 120° C. Change in transmittance | | Exposure to humid heat atmosphere of 85° C. and 90% Change in transmittance | |
| | Thickness [mm] | transmittance [%] | transmittance [%] | Haze [%] | Visible light [%] | Sunlight [%] | Visible light [%] | Sunlight [%] |
| Example 1 | 0.75 | 79.6 | 48.6 | 0.9 | 0.6 | 1.4 | 2.1 | 3.7 |
| Example 2 | 0.75 | 79.7 | 48.5 | 0.9 | 0.6 | 1.3 | 2.0 | 3.8 |
| Example 3 | 0.75 | 76.4 | 46.7 | 2.3 | 0.7 | 1.6 | 2.1 | 3.7 |
| Example 4 | 10 | 79.3 | 48.5 | 0.9 | 0.6 | 1.2 | 2.0 | 3.8 |
| Example 5 | 0.75 | 79.5 | 48.7 | 0.9 | 0.6 | 1.4 | 2.0 | 3.7 |
| Example 6 | 0.75 | 79.9 | 48.9 | 0.9 | 0.6 | 1.4 | 2.0 | 3.8 |
| Example 7 | 0.75 | 71.5 | 47.2 | 1.0 | 0.8 | 2.9 | 3.4 | 7.1 |
| Example 8 | 0.75 | 79.2 | 47.8 | 1.0 | 0.6 | 1.5 | 2.3 | 4.0 |
| Comparative Example 1 | 0.75 | 79.2 | 48.4 | 0.9 | 4.0 | 11.5 | 2.0 | 3.8 |
| Comparative Example 2 | 0.75 | 79.3 | 48.6 | 0.9 | 0.6 | 6.0 | 2.0 | 3.8 |
| Comparative Example 3 | 0.75 | 79.5 | 48.2 | 0.9 | 3.5 | 10.7 | 2.0 | 3.8 |
| Comparative Example 4 | 0.75 | 78.6 | 48.9 | 0.9 | 3.7 | 11.3 | 2.0 | 3.8 |
| Comparative Example 5 | 0.75 | 71.2 | 47.3 | 1.0 | 6.7 | 14.8 | 3.4 | 7.1 |
| Comparative Example 6 | 0.75 | 88.8 | 86.4 | 0.7 | −0.3 | −0.2 | −47.8 | −14.9 |
| Comparative Example 7 | 0.75 | 88.9 | 86.4 | 0.7 | −0.3 | −0.2 | −0.1 | −0.1 |
| Comparative Example 8 | 0.75 | 79.3 | 48.0 | 1.0 | 4.5 | 12.4 | 2.4 | 4.0 |

The invention claimed is:

1. An absorbing fine particle dispersion liquid containing liquid medium, absorbing fine particles dispersed in the medium, and a phosphite ester compound, wherein
surfaces of the absorbing fine particles are coated with the phosphite ester compound,
the absorbing fine particles are one or more kinds of oxide fine particles selected from tungsten oxide fine particles represented by a general formula WyOz in which the W is tungsten, the O is oxygen, and $2.2 \leq z/y \leq 2.999$, and composite tungsten oxide fine particles represented by a general formula MxWyOz in which the M is one or more elements selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb, the W is tungsten, the O is oxygen, $0.001 \leq x/y \leq 1$, and $2.0 \leq z/y \leq 3$,
a crystallite size of the absorbing fine particles is from 10 nm or more to 70 nm or less,
the phosphite ester compound is represented by the following structural formula (1), and
an addition amount of the phosphite ester compound is from more than 2000 parts by mass to 50000 parts by mass or less with respect to 100 parts by mass of the absorbing fine particles;

Structural formula (1)

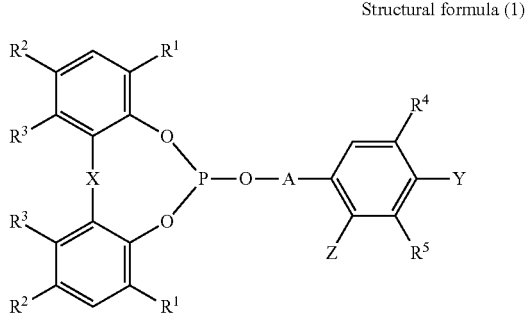

where, in the structural formula (1), $R^1$, $R^2$, $R^4$ and $R^5$ are each independently a hydrogen atom, an alkyl group having 1 to 8 carbon atoms, an alicyclic group having 5 to 12 carbon atoms, an aralkyl group having 7 to 12 carbon atoms or an aromatic group, $R^3$ is either a hydrogen atom or an alkyl group having 1 to 8 carbon atoms, and X is any one of a single bond or a sulfur atom or a divalent residue represented by structural formula (1-1), Structural formula (1-1)

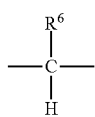

A is either an alkylene group having 2 to 8 carbon atoms or a divalent residue represented by structural formula (1-2), Structural formula (1-2)

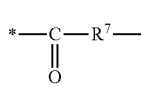

one of Y and Z is a hydroxyl group, an alkyl group having 1 to 8 carbon atoms, an alkoxyl group having 1 to 8 carbon atoms, or an aralkyloxy group having 7 to 12 carbon atoms, and the other one is either a hydrogen atom or an alkyl group having 1 to 8 carbon atoms, in the structural formula (1-1), $R^6$ is a hydrogen atom or an alkyl group having 1 to 5 carbon atoms, and in the structural formula (1-2), $R^7$ is either a single bond or an alkylene group having 1 to 8 carbon atoms, and

* indicates that the residue is bonded to an oxygen atom side of the phosphite ester compound represented by the structural formula (1).

2. The absorbing fine particle dispersion liquid according to claim 1, further containing one or more kinds of stabilizers selected from a phosphoric acid-based stabilizer other than the phosphite ester compound, a hindered phenol-based stabilizer, a sulfide-based stabilizer, and a metal deactivator.

3. The absorbing fine particle dispersion liquid according to claim 1, wherein the absorbing fine particles are composite tungsten oxide fine particles represented by the general formula MxWyOz, and the M is one or more kinds selected from Cs, Rb, K, Tl, In, Ba, Li, Ca, Sr, Fe and Sn.

4. The absorbing fine particle dispersion liquid according to claim 1, wherein the absorbing fine particles are composite tungsten oxide fine particles having a hexagonal crystal structure.

5. The absorbing fine particle dispersion liquid according to claim 1, wherein surfaces of the absorbing fine particles are coated with a compound containing at least one element of Si, Ti, Zr, Al and Zn.

6. The absorbing fine particle dispersion liquid according to claim 1, wherein the medium for dispersing the absorbing fine particles is a polymer molecule.

7. The absorbing fine particle dispersion liquid according to claim 1, further containing a metal deactivator which is hydrazine derivatives, salicylic acid derivatives, or oxalic acid derivatives.

8. An absorbing body containing absorbing fine particles dispersed in a medium and a phosphite ester compound, wherein surfaces of the absorbing fine particles are coated with the phosphite ester compound, the absorbing fine particles are one or more kinds of oxide fine particles selected from tungsten oxide fine particles represented by a general formula WyOz in which the W is tungsten, the O is oxygen, and $2.2 \leq z/y \leq 2.999$), and composite tungsten oxide fine particles represented by a general formula MxWyOz in which the M is one or more elements selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Sc, Br, Te, Ti, Nb, V, Mo, Ta, Re, Be, Hf, Os, Bi, I, and Yb, the W is tungsten, the O is oxygen, $0.001 \leq x/y \leq 1$, and $2.0 \leq z/y \leq 3$, a crystallite size of the absorbing fine particles is from 10 nm or more to 70 nm or less, the phosphite ester compound is represented by the following structural formula (1), and an addition amount of the phosphite ester compound is from more than 2000 parts by mass to 50000 parts by mass or less with respect to 100 parts by mass of the absorbing fine particles, Structural formula (1)

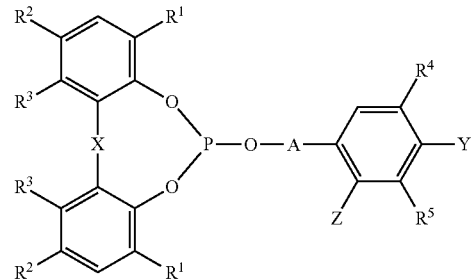

where in the structural formula (1), $R^1$, $R^2$, $R^4$ and $R^5$ are each independently a hydrogen atom, an alkyl group having 1 to 8 carbon atoms, an alicyclic group having 5 to 12 carbon atoms, an aralkyl group having 7 to 12 carbon atoms or an aromatic group, $R^3$ is either a hydrogen atom or an alkyl group having 1 to 8 carbon atoms, and X is any one of a single bond or a sulfur atom or a divalent residue represented by structural formula (1-1), Structural formula (1-1)

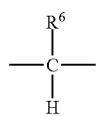

A is either an alkylene group having 2 to 8 carbon atoms or a divalent residue represented by structural formula (1-2), Structural formula (1-2)

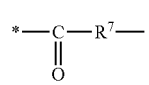

one of Y and Z is a hydroxyl group, an alkyl group having 1 to 8 carbon atoms, an alkoxyl group having 1 to 8 carbon atoms, or an aralkyloxy group having 7 to 12 carbon atoms, and the other one is either a hydrogen atom or an alkyl group having 1 to 8 carbon atoms, in the structural formula (1-1), $R^6$ is a hydrogen atom or an alkyl group having 1 to 5 carbon atoms, and in the structural formula (1-2), $R^7$ is either a single bond or an alkylene group having 1 to 8 carbon atoms, and * indicates that the residue is bonded to an oxygen atom side of the phosphite ester compound represented by the structural formula (1).

9. The absorbing body according to claim 8, further containing one or more kinds of stabilizers selected from a phosphoric acid-based stabilizer other than the phosphite ester compound, a hindered phenol-based stabilizer, a sulfide-based stabilizer, and a metal deactivator.

10. The absorbing body according to claim 8, wherein the absorbing fine particles are composite tungsten oxide fine particles represented by the general formula MxWyOz, and the M is one or more kinds selected from Cs, Rb, K, Tl, in, Ba, Li, Ca, Sr, Fe and Sn.

11. The absorbing body according to claim 8, wherein the absorbing fine particles are composite tungsten oxide fine particles having a hexagonal crystal structure.

12. The absorbing body according to claim 8, wherein surfaces of the absorbing fine particles are coated with a compound containing at least one element of Si, Ti, Zr, Al and Zn.

13. The absorbing body according to claim 8, wherein a medium for dispersing the absorbing fine particles is a polymer molecule.

14. The absorbing body according to claim 8, wherein the medium for dispersing the absorbing fine particles is polycarbonate resin, acrylic resin, olefin resin, polystyrene resin, polyamide resin, polyethylene terephthalate resin, fluorine resin, vinyl chloride resin, or epoxy resin.

15. A method for producing an absorbing fine particle dispersion liquid, comprising:

mixing absorbing fine particles which are one or more kinds of oxide fine particles selected from tungsten oxide fine particles represented by a general formula WyOz in which the W is tungsten, the O is oxygen, and 2.25≤z/y≤2.999), and composite tungsten oxide fine particles represented by a general formula MxWyOz in which the M is one or more elements selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, Yb, the W is tungsten, the O is oxygen, 0.001≤x/y≤1, and 2.0≤z/y≤3, wherein a crystallite size of the absorbing fine particles is from 10 nm or more to 70 nm or less, and one selected from the group consisting of water, an organic solvent, a liquid resin, an oil and fat, a liquid plasticizer for the resin, a high molecular monomer, and a mixture of two or more thereof, then dispersing the mixed matter obtained by the mixing step to obtain a dispersion liquid of absorbing fine particles;

adding from more than 2000 parts by mass to 50,000 parts by mass or less of a phosphite ester compound with respect to 100 parts by mass of the absorbing fine particles while stirring the dispersion liquid; and continuing the stirring after the addition of the phosphite ester compound, to obtain a dispersion liquid of the absorbing fine particles whose surfaces are coated with the phosphite ester compound.

* * * * *